Nov. 13, 1951         J. M. PETERS         2,574,754
                      COLLET CHUCK
Filed March 25, 1949                      2 SHEETS—SHEET 1
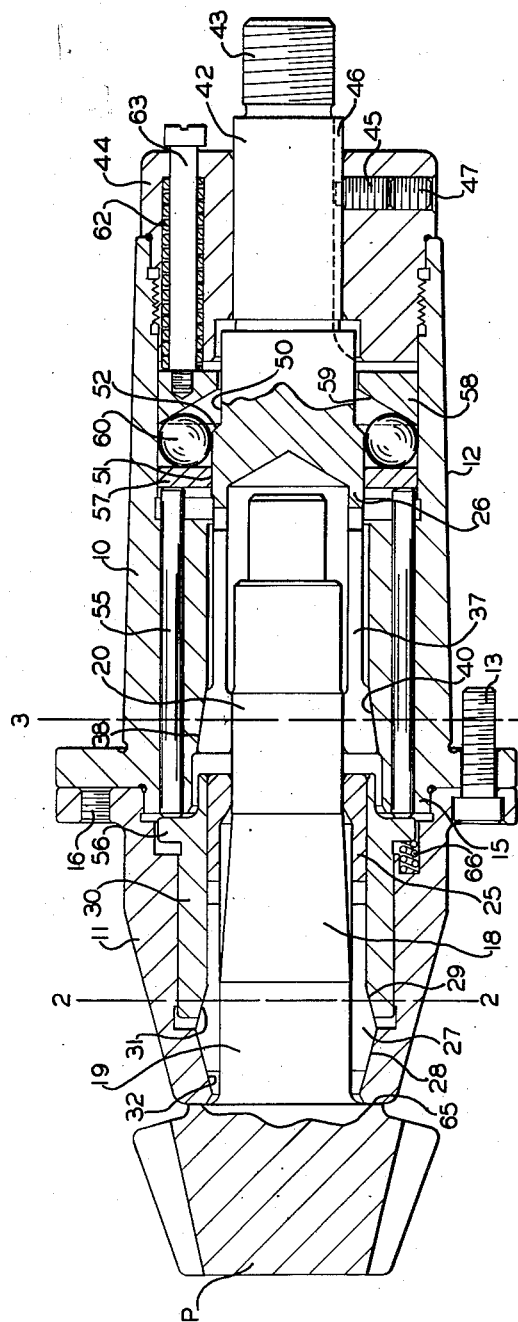
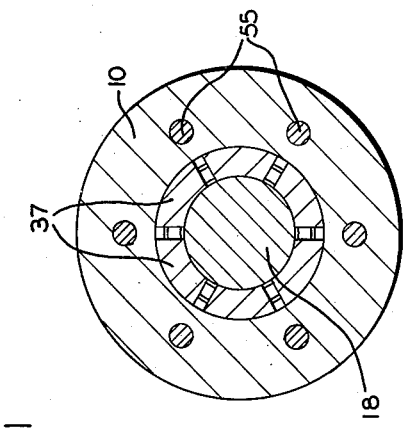
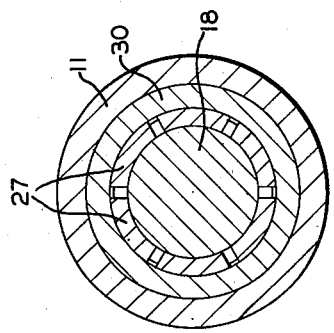
INVENTOR.
JOSEPH M. PETERS
BY
           Attorney Nov. 13, 1951     J. M. PETERS     2,574,754
COLLET CHUCK
Filed March 25, 1949     2 SHEETS—SHEET 2
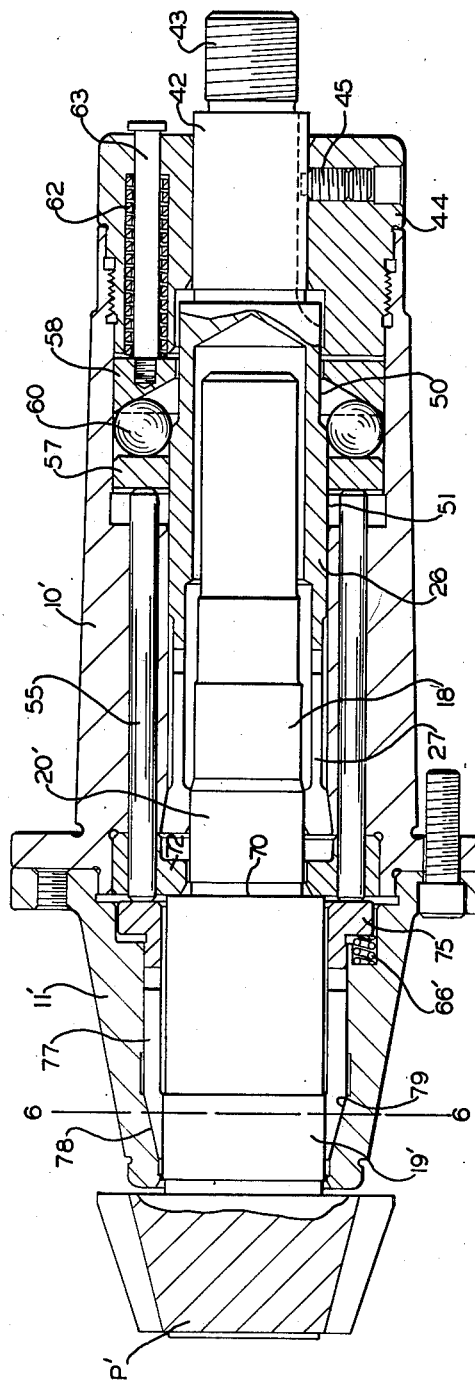
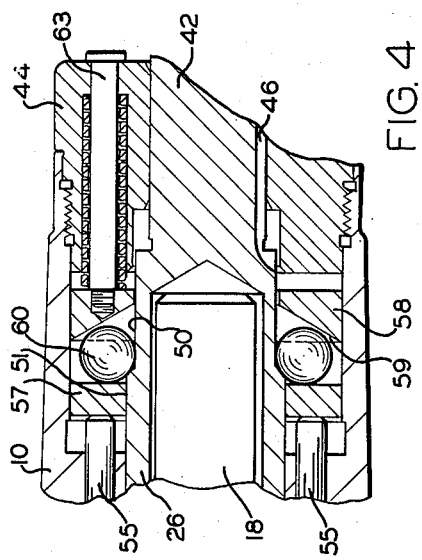
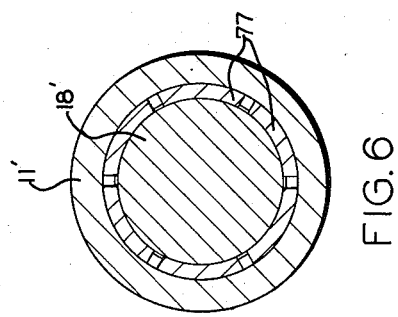
INVENTOR.
JOSEPH M. PETERS
BY *B. Schlesinger*
Attorney Patented Nov. 13, 1951

2,574,754

UNITED STATES PATENT OFFICE 2,574,754

COLLET CHUCK

Joseph M. Peters, Rochester, N. Y., assignor to Gleason Works, Rochester, N. Y., a corporation of New York Application March 25, 1949, Serial No. 83,408

10 Claims. (Cl. 279—51)

The present invention relates to chucks and more particularly to collet-type chucks such as may be employed in the chucking of stem-type gear pinions.

Bevel and hypoid pinions, such as are used in automotive drives, are ordinarily of the stem type, that is, they have a stem or shank integral with the pinion by which the pinion is mounted in the automotive vehicle. The stem portion of the pinion is ordinarily made long enough to permit mounting the pinion in two spaced anti-friction bearings to hold the pinion with sufficient rigidity.

In the manufacture of these pinions the bearing surfaces are formed (turned and, most frequently, ground) at an early stage of production so that when the teeth are to be cut, ground, burnished, lapped, or tested, etc., the pinion can be mounted in the cutting, grinding, burnishing, lapping, or testing machine on the same surfaces on which the pinion is to run when in use. In chucking one of these pinions on a cutting, grinding, burnishing, lapping or testing machine, to work on the teeth thereof, the conventional method is to use a chuck having a plain cylindrical bearing to receive one bearing surface of the pinion stem, and a collet, to clamp the other bearing surface of the pinion stem. The chuck is, of course, mounted in the work spindle of the machine; the collet is connected to the draw-bar of the machine; and means is provided for compressing the collet to grip the stem or shank of the pinion when the draw-bar is drawn rearwardly in the work spindle.

As will be obvious, the bearing portion of the pinion shank which engages in the cylindrical bearing of the chuck must be ground very accurately in order properly to center the pinion in the work spindle.

If there is excessive play between the bearing surface and its seat, and there must always be sufficient clearance to permit the stem of the pinion to be slid into the bearing, then the pinion will not be centered accurately; and the work thereon will not be as precise as may be desired. In any event, due to the necessary sliding fit between the bearing surface and its seat, there is always the tendency of cutting or grinding torque to twist the pinion in its bearing and to set up chatter, deleteriously affecting the quality of finish of the pinion teeth. Moreover, run out or eccentricity between the teeth of the pinion and the bearing portions is difficult to control in view of the extreme accuracies required by present-day standards.

The primary purpose of the present invention is to provide an improved type of collet chuck which will hold a shank type pinion rigidly in any kind of machine in which work is to be done on the pinion.

A further object of the invention is to provide a collet type chuck which will hold the work accurately without requiring the high degree of accuracy in grinding of the bearing surfaces of the pinion shank which has been necessary heretofore.

Another object of the invention is to provide a collet type chuck having two separate, axially-spaced collet portions adapted to clamp the two spaced bearing portions of a shank pinion, respectively, and so constructed that pressure is applied to these two collet portions successively instead of simultaneously.

A further object of the invention is to provide a collet type chuck which will permit of greater tolerances in manufacture in turning and/or grinding the bearing surfaces of the shanks of pinions which are to be clamped in such a chuck. The present invention has, therefore, for further objects, reduction in cost and simplification of the manufacture of the pinion itself.

Other objects of the invention will be apparent hereinafter from the specification and from the recital of the appended claims.

In the chuck of the present invention there are two compression type collets employed. Each grips one of the bearing portions of the pinion shank. One bearing portion of the pinion shank is gripped before the other. The action of the chuck is first to center the pinion accurately in the spindle or arbor, and then to clamp the pinion in the spindle or arbor rigidly in its centered position. The two collets eliminate all play between the bearing portions of the pinion shank and the work spindle. Moreover, they prevent cutting or grinding torques from setting up chatter or introducing any inaccuracies into the work.

With the chuck of the present invention it does not make any difference if the diameters of the shank bearing portions are slightly undersized or slightly oversized, so long as they are held to size within reason. The collets will grip and center them just the same. With the present structure, therefore, manufacturing tolerances can be increased, cheapening the manufacture of the pinion and reducing spoilage. At the same time the accuracies of chucking and of the work done on the pinion is increased.

In the drawings:

Fig. 1 is a longitudinal sectional view showing a collet type chuck constructed according to one embodiment of this invention having a stem type bevel or hypoid pinion mounted therein;

Fig. 2 is a section on the line 2—2 of Fig. 1;

Fig. 3 is a section on the line 3—3 of Fig. 1;

Fig. 4 is a fragmentary longitudinal sectional view showing the chuck in released position;

Fig. 5 is a longitudinal sectional view similar to that of Fig. 1 but showing a chuck constructed according to a different embodiment of the invention; and Fig. 6 is a section on the line 6—6 of Fig. 5.

Referring now to the drawings by numerals of reference and in particular first to the embodiment of the invention shown in Figs. 1 to 4 inclusive, 10 denotes the sleeve portion of the chuck; and 11 designates its nose. The sleeve 10 has a conical external surface 12 to fit into the bore of the spindle of the machine on which the pinion is to be chucked. The nose-piece is adapted to fit over a cylindrical collar portion 15 of the sleeve; and both sleeve and nose-piece may be secured to the spindle by screws 13 whose heads seat in recesses in the nose piece 11, pass through aligned holes in the nose piece 11 and sleeve 10 and thread into the work spindle. Jack-off screws 16 are provided to permit easy removal of the nose piece from the sleeve. These engage the front face of the sleeve.

P designates the pinion which is to be chucked. This pinion has an integral stem or shank 18. The stem has a forward cylindrical bearing portion 19 of relatively large diameter and a rear cylindrical bearing portion 20 of smaller diameter. It is by means of these bearing portions that the pinion is mounted in spaced anti-friction bearings in the rear axle of the automotive vehicle which it is to drive.

For securing the pinion P in the chuck, a pair of axially spaced collets 25 and 26 are employed. The collet member 25 is mounted within the nose piece 11. The collet member 26 is mounted within the sleeve 10.

The collet member 25 is slotted axially in conventional fashion to provide a plurality of gripping fingers 27. These fingers 27 are shaped to have adjoining external conical surfaces 28 and 29. The conical surfaces 28 and 29 are reversely disposed, the conical surface 28 having an apex forward of the front face of the collet, and the conical surface 29 having an apex rearwardly of said front face.

The collet 25 is mounted within a tubular actuating member 30 which is in turn slidably mounted within the nose piece 11. The member 30 is adapted to be moved forwardly within the nose piece 11 to actuate the collet fingers 27 to chucking position. The member 30 has an internal conical surface 31 adapted to engage and cooperate with the external conical surface 29 of the collet fingers. This surface also forces the collet member 25 forwardly when the member 30 is moved forwardly. The nose piece 11 itself has an internal conical surface 32 complementary to the external conical surface 28 of the fingers 27 of the collet. Thus, when the member 30 is moved forwardly the conical surface 31 engages the tapered surfaces 29 of the fingers 27, and the collet member 25 is moved forwardly to cause the internal conical surface 32 of the nose piece 11 to engage contractingly the external tapered surfaces 28 of the collet fingers. Thus, the collet fingers are compressed by cooperative action of the internal conical surfaces 31 and 32 of the member 30 and nose piece 11, respectively, to grip the bearing portion 19 of the stem 18.

The collet member 26 is axially slotted to provide a plurality of gripping fingers 37. These fingers are shaped adjacent their front end to have external tapered surfaces 38. The collet member 26 is mounted to slide in the sleeve 10 and the external tapered surfaces 38 of the fingers cooperate with an internal, conical surface 40 formed within the sleeve 10.

The collet member 26 has an integral rearwardly extending stem portion 42 that is threaded, as denoted at 43, for connection to the draw-bar of the work spindle of the machine. The collet member 26 is guided in its reciprocating movement within the sleeve 10 by a guide sleeve 44 which is threaded into the rear end of the sleeve 10. A screw 45 that threads into the guide sleeve 44 and that is adapted to engage within an axial slot 46 in the stem portion 42 of the collet member 26, serves to prevent rotation of the collet member within the sleeve 10. Screw 45 may be locked in position by a locking screw 47.

The stem portion of the collet member 26 is formed with two axially spaced cylindrical surfaces 50 and 51. The cylindrical surface 51 is of larger diameter than the cylindrical surface 50. The two cylindrical surfaces are connected by a conical surface portion 52.

Mounted to slide within equi-angularly spaced holes formed in the sleeve 10 are a plurality of parallel, axially extending rods 55. These rods are adapted to engage at one end with the rear face of a flange 56 formed on the member 30. At their opposite ends, these rods 55 engage a ring 57 which fits over the cylindrical part 51 of the stem 42 of collet member 26 and serves as an auxiliary guide for the collet member in its movement within the bore of the sleeve 10.

Mounted within the bore of the sleeve 10 to surround the cylindrical part 50 of stem 42 of collet member 26 is another ring 58. This ring has an internal conical surface 59 formed on its front face. Interposed between the rings 57 and 58 are a plurality of balls 60. The ring 58 is mounted to slide within the bore of sleeve 10 and is spring-pressed forwardly in the sleeve by a plurality of angularly spaced coil springs 62 which are housed within recesses formed in the guide member 44. These springs surround studs 63 which are threaded into the ring member 58, and which slide in the guide member 44 and which serve to limit the forward movement of the ring member 58, their heads engaging the rear face of the guide member 44 for this last-named purpose.

To chuck a pinion P in the work spindle of the machine, the stem portion 18 of the pinion is inserted through the front end of the nose piece 11 into the fingers 27 of collet member 25 and into the fingers 37 of collet member 26. The draw-bar of the chucking mechanism of the machine is then moved to chucking position. This causes the collet member 26 to be moved to the right from the position of Fig. 4 to that of Fig. 1. As the draw-bar moves to the right, the balls 60 are caught between the external conical portion 52 of the stem of collet member 26 and the internal conical surface 59 of ring member 58. The balls are therefore forced up off of the smaller diameter portion 50 of collet member 26 onto the larger diameter portion 51 thereof. The springs 62, which back up the ring member 58, are fairly heavy so that the ring 58 does not yield very much. The spring-pressed ring 58, therefore, forces the balls 60 against the ring 57 which, in turn, pushes the rods 55 forward in the sleeve 10, forcing the actuating member 30 forward in the nose piece 11. This forward movement of the member 30 causes the fingers 27 of collet member 25 to be compressed, to grip the bearing portion 19 of the stem 18 of the work. This completes the chucking operation. As the collet member 26 moves to the right, also, the fingers of collet member 26 are compressed to grasp the bearing portion 20 of the stem 18 of the pinion through interaction of the externally tapered portions 38 of the collet fingers with the internal conical surface 40 of the bore of the sleeve 10. As the draw-bar moves to the right, also, the pinion P is pulled rearwardly in the nose piece 11 and sleeve 10 until the shoulder 65 of the pinion seats firmly against the front face of the nose piece 11.

To release the chuck, the draw-bar is moved forwardly in the work spindle of the machine, to move collet member 26 to the left from the position shown in Fig. 1 to that of Fig. 4. In this releasing movement, the collet fingers 37 of collet member 26 will be released and the balls 60 will then be free to ride down onto the smaller diameter portion 50 of the stem of collet member 26. This will withdraw the pressure from the rods 55; and the coil springs 66, which are mounted within recesses of the nose piece 11 and which engage the front face of the flange 56 of member 30, will then move the sleeve to released position.

The internal conical surface 32 of nose piece 11 and the internal conical surface 40 of sleeve 10 are ground with precision to be coaxial with the work spindle of the machine. Thus, the pinion P will be centered accurately in the spindle when the fingers 27 of the collet 25 grip the shank of the work. When the collet fingers 37 of the collet 26 grip the work, then, the pinion will be held firmly in centered position.

A slightly different embodiment of the invention is illustrated in Figs. 5 and 6. This is for the purpose of chucking a stem pinion P' whose stem portion 18' has a seating shoulder formed at 70. In this case, the sleeve 10' is provided with a hardened seating ring 72 against which the shoulder 70 of the work is adapted to seat when the work is chucked.

In the case of this chuck, the rear collet 26 is of substantially the same structure as previously described. The forward collet 75 is of considerably different construction from the forward collet 25 of Fig. 1. Forward collet 75 is axially slotted to provide gripping fingers 77. These have tapered outer surfaces 78 that are adapted to coact with an internally conical surface 79 ground within the bore of the nose piece 11'. The collet member 75 is adapted to be compressed to grip the bearing portion 19' of the stem 18' of pinion P' by forward movement of collet 75 in the bore of the nose piece 11'. This forward movement is against the action of the springs 66' and is effected in a manner similar to that described with reference to the embodiment of the invention illustrated in Figs. 1 to 4 inclusive.

When the draw-bar of the machine is moved rearwardly in the work spindle of the machine, the collet member 26 is moved to the right, and the balls 60 ride up onto the larger diameter cylindrical portion 51 of the stem 42 of collet member 26 and cause ring member 57 to force the rods 55 forward in the sleeve 10'. These rods, which pass through holes in the seating member 72 engage the rear face of collet member 75. They, therefore, then force collet member 75 forwardly in the bore of the nose piece 11', causing the collet fingers 77 to be compressed to grip the bearing portion 19' of the work. As the collet member 26 moves to the right, also, its fingers 27 are compressed to grip the bearing portion 20' of the stem of the work. As the draw-bar moves further rearwardly, then, the shoulder 70 of the stem of the work is drawn against the front face of the seating member 72. This completes the chucking.

With either embodiment of the invention, it will be seen that the work is first gripped by one of the collet members, gripped by the collet member and then drawn back against a seating shoulder. The pressures exerted on the two collets are independent of one another. The work is first firmly grasped and centered up within the work spindle, then seated against the locating shoulder. The work is therefore firmly held against any cutting or grinding torque.

While the invention has been described in connection with the chucking of bevel or hypoid pinions, it will be understood that it is applicable to chucks for holding various types of work. Further, while different embodiments of the invention have been illustrated and described, it will be understood that the invention is capable of various further modifications. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Chucking apparatus comprising an arbor, two axially spaced split collets mounted in the arbor, said arbor having two axially spaced surfaces adapted to cooperate, respectively, with the two collets to actuate the collets to gripping position on relative axial movement between a collet and its cooperating surface, means for effecting relative axial movement between one of the collets and its cooperating surface to move said one collet to gripping position, and means actuated by the relative axial movement between said one collet and its cooperating surface, to effect relative axial movement between the other collet and its cooperating surface to move the other collet to gripping position.

2. Chucking apparatus comprising an arbor, two axially spaced split collets reciprocably mounted in said arbor, said arbor and one collet having cooperating surfaces for compressing said one collet to grip a workpiece when said one collet is moved axially in one direction in the arbor, and means operable by movement of said one collet toward compressed position to compress the other collet.

3. Chucking apparatus comprising an arbor, two axially spaced split collets mounted in said arbor, said arbor and one collet having cooperating surfaces for compressing said one collet to grip a workpiece when said one collet is moved axially in one direction in said arbor and means operable by said one collet in its movement in the said one direction to force the other collet to move axially in the opposite direction in the arbor to grip said workpiece in a part spaced axially from the part gripped by the said one collet.

4. Chucking apparatus comprising an arbor, two axially spaced split collets mounted in said arbor, said arbor and one collet having cooperating surfaces for compressing said one collet to grip a workpiece when said one collet is moved axially in one direction in said arbor, and means for compressing the other collet to grip the workpiece comprising a plurality of angularly spaced axially movable rods, and means movable upon movement of said one collet to gripping position to actuate said rods to move the other collet to gripping position.

5. Chucking apparatus comprising an arbor, two axially spaced split collets mounted in said arbor, said arbor and one collet having cooperating surfaces for compressing said one collet to grip a workpiece when said one collet is moved axially in one direction in said arbor, said one collet having axially spaced portions of two different diameters and means adapted to ride from one of said portions onto the other upon movement of said one collet to gripping position, and means actuatable by the said movement of the last-named means for moving the other collet to gripping position.

6. Chucking apparatus comprising an arbor, two axially spaced split collets mounted in said arbor, said arbor and one collet having cooperating surfaces for compressing said one collet to grip a workpiece when said one collet is moved axially in one direction in said arbor, said one collet having a stem provided with axially spaced cylindrical portions of two different diameters, a pair of rings surrounding said stem and having opposed surfaces which are inclined to one another, a plurality of balls interposed between said rings and arranged to ride from one of said two cylindrical portions onto the other during movement of said one collet axially, means for limiting movement of one ring axially in the arbor, and means connecting the other ring to the other collet to compress said other collet when the balls ride up onto the larger diameter portion of said stem.

7. Chucking apparatus comprising an arbor, a split collet mounted in said arbor, said arbor and collet having cooperating surfaces for compressing said collet to grip a workpiece when said collet is moved axially in one direction in said arbor, said collet having a stem provided with axially spaced cylindrical portions of two different diameters, a pair of rings surrounding said stem, one of which has a surface opposed to the other which is inclined to the axis of said stem, a plurality of balls interposed between said rings and arranged to ride from one of said two cylindrical portions onto the other during movement of said collet axially, a second collet mounted in said arbor in axially spaced relation to the first collet, a sleeve surrounding said second collet, said sleeve and second collet having cooperating surfaces for compressing said second collet upon movement of the sleeve in one direction in the arbor, spring means for limiting movement of one ring axially in the arbor, and means connecting said sleeve to the other ring to move the sleeve to collet-compressing position when said other ring is moved axially by said balls.

8. Chucking apparatus comprising an arbor, a split collet mounted in said arbor, said arbor and collet having cooperating surfaces for compressing said collet to grip a workpiece when said collet is moved axially in one direction in said arbor, a second collet mounted in said arbor in axially spaced relation to the first collet, two axially spaced members having opposite surfaces which converge away from the axis of the first collet, a part mounted between said members for actuating the second collet to compressed position when said part is moved radially away from the axis of said first collet, and means operable on movement of the first collet to compressed position for moving said part radially outwardly away from the axis of said first collet.

9. Chucking apparatus comprising an arbor, two axially spaced split collets mounted in said arbor, said arbor and one collet having cooperating surfaces for compressing said one collet to grip a workpiece when said one collet is moved axially rearwardly in said arbor, and means actuated by said one collet in its rearward movement to force the other collet to move axially forwardly in the arbor thereby to compress said other collet to grip the workpiece in a part spaced axially from the part gripped by the said one collet.

10. Chucking apparatus comprising an arbor, a split collet mounted in said arbor, said arbor and collet having cooperating surfaces for compressing said collet to grip a workpiece when said collet is moved axially rearwardly in said arbor, said collet having a stem provided with axially spaced cylindrical portions of two different diameters, a pair of rings surrounding said stem, one of which has a surface opposed to the other which is inclined to the axis of the stem, a plurality of balls interposed between said rings and contacting said stem and arranged to ride from one of the two cylindrical portions of said stem onto the other during movement of the collet axially to force one ring axially forward, spring means limiting axial rearward movement of the other ring, a second collet mounted in said arbor in axially spaced relation to the first collet, a sleeve surrounding the second collet, said sleeve and second collet having cooperating surfaces for compressing said second collet upon movement of the sleeve forwardly axially in the arbor, and a plurality of angularly spaced rods surrounding said stem and interposed between said one ring and the sleeve to move the sleeve to collet-compressing position when said one ring is moved axially forward by said balls.

JOSEPH M. PETERS.

REFERENCES CITED

The following references are of record in the file of this patent:

UNITED STATES PATENTS

| Number | Name | Date |
| --- | --- | --- |
| 1,741,734 | Pannwitz | Dec. 31, 1929 |
| 2,002,282 | Tessky | May 21, 1935 |
| 2,227,620 | Armitage et al. | Jan. 7, 1941 |
| 2,413,010 | Imblum | Dec. 24, 1946 |

FOREIGN PATENTS

| Number | Country | Date |
| --- | --- | --- |
| 328,703 | Italy | of 1935 |